United States Patent
Hirano et al.

(10) Patent No.: US 7,660,895 B2
(45) Date of Patent: Feb. 9, 2010

(54) COMMUNICATION TERMINAL ACCOMMODATION APPARATUS AND SCHEDULING METHOD

(75) Inventors: Jun Hirano, Yokosuka (JP); Takashi Aramaki, Yokohama (JP)

(73) Assignee: Panasonic Corporation, Osaka (JP)

( * ) Notice: Subject to any disclaimer, the term of this patent is extended or adjusted under 35 U.S.C. 154(b) by 1306 days.

(21) Appl. No.: 10/111,673

(22) PCT Filed: Aug. 29, 2001

(86) PCT No.: PCT/JP01/07404

§ 371 (c)(1),
(2), (4) Date: Apr. 26, 2002

(87) PCT Pub. No.: WO02/19633

PCT Pub. Date: Mar. 7, 2002

(65) Prior Publication Data

US 2002/0156907 A1    Oct. 24, 2002

(30) Foreign Application Priority Data

Aug. 30, 2000  (JP)  .............................. 2000-261951

(51) Int. Cl.
G06F 15/16 (2006.01)
H04W 4/00 (2006.01)
H04B 7/212 (2006.01)
H04L 12/43 (2006.01)

(52) U.S. Cl. ...................... 709/226; 709/218; 709/227; 709/228; 709/249; 370/341; 370/348; 370/458

(58) Field of Classification Search .................. 709/229, 709/249, 218, 227, 228; 370/338, 341, 348, 370/352, 458, 395.5
See application file for complete search history.

(56) References Cited

U.S. PATENT DOCUMENTS

| | | | | |
|---|---|---|---|---|
| 5,191,593 A | * | 3/1993 | McDonald et al. | 375/130 |
| 5,781,542 A | * | 7/1998 | Tanaka et al. | 370/342 |
| 5,864,674 A | * | 1/1999 | Goldman et al. | 709/221 |
| 5,903,548 A | | 5/1999 | Delamater | |
| 5,928,325 A | * | 7/1999 | Shaughnessy et al. | 709/206 |

(Continued)

FOREIGN PATENT DOCUMENTS

JP    05102969    4/1993

(Continued)

OTHER PUBLICATIONS

International Search Report dated Dec. 11, 2001.
European Search Report dated Aug. 26, 2009.
Dr-Jiunn Deung, et al., "A Priority Scheme for IEEE 802.11 DCF Access Method," XP-000927880, IEICE Transactions on Communications, Tokyo, JP, vol. E82-B, No. 1, Jan. 1999, pp. 96-102.

*Primary Examiner*—Philip J Chea
(74) *Attorney, Agent, or Firm*—Dickinson Wright PLLC

(57) ABSTRACT

A DL resource control section 203 controls the status of communication resource assignment of a direct link type network. An MS resource control section 204 controls the status of communication resource assignment of a master-slave type network. When carrying out communications between terminal apparatus held in different networks, a transmission resource assigning section 205 refers to the status of communication resource assignment of the two networks controlled by the DL resource control section 203 and the MS resource control section 204 and assigns the same communication resources to both terminal apparatus of a transmitting side and a receiving side. Thus, the communication resources can be utilized effectively when carrying out communications between the terminal apparatus held in different networks respectively.

6 Claims, 14 Drawing Sheets

U.S. PATENT DOCUMENTS

| | | | | |
|---|---|---|---|---|
| 5,970,062 | A * | 10/1999 | Bauchot | 370/310.2 |
| 6,018,521 | A * | 1/2000 | Timbs et al. | 370/342 |
| 6,219,840 | B1 * | 4/2001 | Corrigan et al. | 725/117 |
| 6,600,726 | B1 * | 7/2003 | Nevo et al. | 370/278 |
| 6,606,310 | B1 * | 8/2003 | Vialen et al. | 370/338 |
| 2001/0030949 | A1 * | 10/2001 | Molno et al. | 370/329 |
| 2001/0055298 | A1 * | 12/2001 | Baker et al. | 370/349 |
| 2002/0001294 | A1 * | 1/2002 | Amouris | 370/337 |
| 2002/0112047 | A1 * | 8/2002 | Kushwaha et al. | 709/223 |
| 2002/0118670 | A1 * | 8/2002 | Kari | 370/352 |
| 2003/0050083 | A1 | 3/2003 | Metais | |
| 2003/0083096 | A1 * | 5/2003 | Ma et al. | 455/553 |
| 2005/0250505 | A1 * | 11/2005 | Rasanen | 455/450 |

FOREIGN PATENT DOCUMENTS

| | | |
|---|---|---|
| JP | 07303105 | 11/1995 |
| JP | 10190717 | 7/1998 |
| JP | 11055318 | 2/1999 |
| JP | 11243578 | 9/1999 |
| JP | 11252114 | 9/1999 |
| WO | 01/45440 | 6/2001 |

* cited by examiner

| COMMUNICATION RESOURCES | TRANSMITTING SIDE APPARATUS | RECEIVING SIDE APPARATUS |
|---|---|---|
| T0001-1000 | NOT USED | NOT USED |
| T1001-1200 | CC101 | BC |
| T1201-1280 | WT103 | WT102 |
| T1281-1350 | WT102 | WT103 |
| T1351-2000 | NOT USED | NOT USED |
| ⋮ | ⋮ | ⋮ |

FIG.7

| COMMUNICATION RESOURCES | TRANSMITTING SIDE APPARATUS | RECEIVING SIDE APPARATUS |
|---|---|---|
| T0001-0200 | AP101 | BC |
| T0201-0300 | AP101 | MT105 |
| T0301-0390 | MT105 | AP101 |
| T0391-2000 | NOT USED | NOT USED |
| ⋮ | ⋮ | ⋮ |

FIG.8

COMMUNICATION TERMINAL ACCOMMODATION APPARATUS AND SCHEDULING METHOD

TECHNICAL FIELD

The present invention relates to a communication terminal holding apparatus and a scheduling method which are applied to a wire communication system or a mobile communication system, and more particularly, to a communication terminal holding apparatus and a scheduling method which are applicable to a plurality of networks having different structures from each other.

BACKGROUND ART

In multimedia interface for which the needs has been sharply increased recently, under various user circumstances such as in public, office, home and the like, a high speed and large volume data transmission is desired. As one of multimedia interfaces which provide such high speed and large volume data transmission, a high speed wireless access network, a high speed radio access network or the like are getting the focus of public interest.

As an example of typical structure of such networks, a master-slave type network and a direct link type network are given. In the master-slave type network, by means of a central control via a communication terminal holding apparatus, a plurality of terminal apparatuses carry out communication with the communication terminal holding apparatus. On the other hand, in the direct link type network, by means of a central control via a communication terminal holding apparatus, which has the control right, in one or more communication terminal holding apparatuses, a plurality of terminal apparatuses and another communication terminal holding apparatus carry out each communication.

A master-slave type network shown in FIG. 1 comprises a communication terminal holding apparatus 11 having access point (AP) facility, which is equivalent to a base station apparatus in a mobile communication system, and MT device apparatus 12, 13 and 14 having mobile terminal (MT) facility respectively, which is equivalent to mobile station apparatus such as a portable telephone apparatus or the like. In the master-slave type network, the communication terminal holding apparatus 11 carries out a scheduling thereby communication resources such as time area and frequency or the like are assigned, and communication between the MT device apparatus is always carried out via the communication terminal holding apparatus 11.

A direct link type network shown in FIG. 2 comprises CC/WT device apparatuses 21 and 22 which have a central controller (CC) facility and a wireless terminal (WT) facility, and WT device apparatuses 23 and 24 which have a WT facility only, and communications are performed between the WT device apparatuses directly. In this case, the control right is transferred between the CC/WT device apparatuses 21 and 22, which have a CC facility respectively, and the apparatus having the control right carries out the scheduling.

Accompanying the expansion of application field of the network, are quest to put to use such a network that a master-slave type network and a direct link type network are integrated with each other. Now, such a network that has a communication terminal holding apparatus 31 provided with CC/WT/AP facilities, which is capable of including both of MT device apparatus of a master-slave type network and WT device apparatus of a direct link type network as shown in FIG. 3, will be considered.

To carry out a high speed and large volume data transmission by means of a multimedia radio communication system, it is essential to carry out scheduling effectively on a limited communication resources and various scheduling methods have been proposed. For example, a method is disclosed in a Japanese Unexamined Patent Application Publication No. 11-243578, in which, for a purpose of reducing the controlling load of a base station and making the buffer size smaller even when the number of terminal apparatuses is increased, terminal apparatuses are divided into groups when including the terminal apparatuses and assignment of communication resources is carried out in each group.

In a conventional communication terminal holding apparatus 31 also in a network shown in the foregoing FIG. 3, the scheduling is carried out so as to prevent any competition or collision of the communication resources from occurring when carrying out communications between a WT device apparatus and an MT device apparatus. Now, referring to a timing sheet in FIG. 4, an operation of scheduling in a conventional communication terminal holding apparatus 31 will be described while taking an example of a case where a communication request is made from the WT device apparatus 24 to the MT device apparatus 14. In FIG. 4, the description will be made as to the case where the communication resources are divided on the basis of time region.

First of all, the communication terminal holding apparatus 31 carries out a scheduling to assign communication resources Ta-b of a period of time from a to b, which is presently not used in a direct link type network, and makes a notice of control information 41, which instructs to transmit data by means of a communication resources Ta-b, to the WT device apparatus 24. Then, the WT device apparatus 24 transmits the data 42 by means of the communication resources Ta-b, and the communication terminal holding apparatus 31 receives the data.

Then, the communication terminal holding apparatus 31 carries out a scheduling to assign communication resources Tc-d of a period of time from c to d, which is presently not used in the master-slave type network, and makes a notice of control information 43, which instructs to receive the data by means of the communication resources Tc-d, to the MT device apparatus 14. Then, the communication terminal holding apparatus 31 transmits the data 42 by means of the communication resources Tc-d, and the MT device apparatus 14 receives the data.

As described above, the conventional communication terminal holding apparatus carries out the scheduling on each network to prevent any competition or collision of the communication resources from occurring, once the transmitted data is received from a transmitting side terminal apparatus by means of a certain communication resources by its own apparatus and transmits the data to a receiving side terminal apparatus by means of other communication resources.

However, in the scheduling method of the conventional communication terminal holding apparatus, when carrying out communications between the terminal apparatuses which are held in different networks respectively, since communication resources of different periods of time for transmission and for reception are assigned respectively, such a problem that a high speed and large volume data transmission is prevented from being realized resides in. For example, in a case of the foregoing FIG. 4, in order to transmit the data 42 from the WT device apparatus 24 to the MT device apparatus 14, two periods of communication resources Ta-b and communication resources Tc-d are required.

DISCLOSURE OF INVENTION

An object of the present invention is to provide a communication terminal holding apparatus and a scheduling method which are capable of utilizing communication resources effectively when carrying out communication between terminal apparatus held in different networks from each other, in which a master-slave type network and a direct link type network are integrated.

It is possible to achieve the object by assigning the same communication resources for transmission and for reception while referring to the assignment status of the communication resources of each network when carrying out communication between the terminal apparatus held in different networks.

BRIEF DESCRIPTION OF DRAWINGS

FIG. 7 is a diagram illustrating a control table held by the communication terminal holding apparatus according to the first embodiment of the present invention;

FIG. 8 is a diagram illustrating a control table held by the communication terminal holding apparatus according to the first embodiment of the present invention;

BEST MODE FOR CARRYING OUT THE INVENTION

Now, embodiments of the present invention will be described in detail below with reference to attached drawings.

In the following embodiments, the case, in which communication resources are divided on the basis of time region, will be described.

First Embodiment

Figure 1:
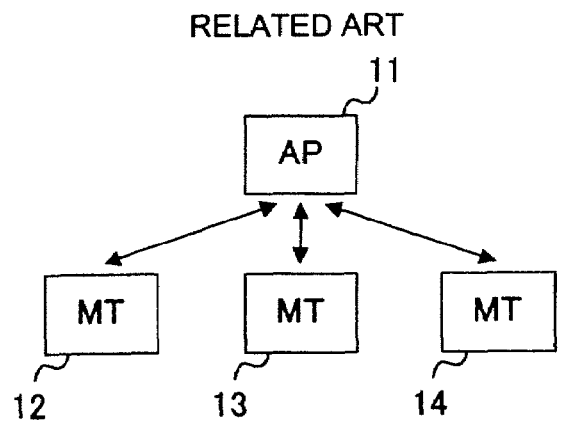
FIG. 1 is a block diagram illustrating a configuration of the master-slave type network.
Figure 2:
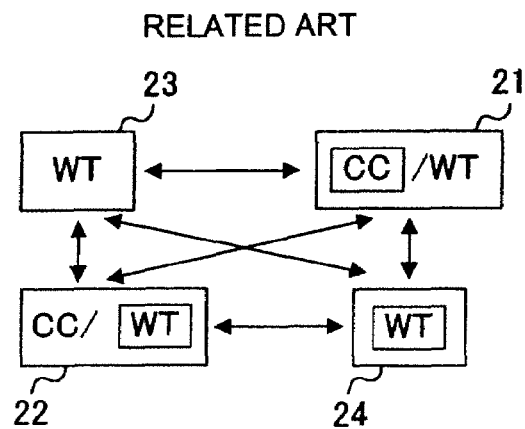
FIG. 2 is a block diagram illustrating a configuration of the direct link type network.
Figure 3:
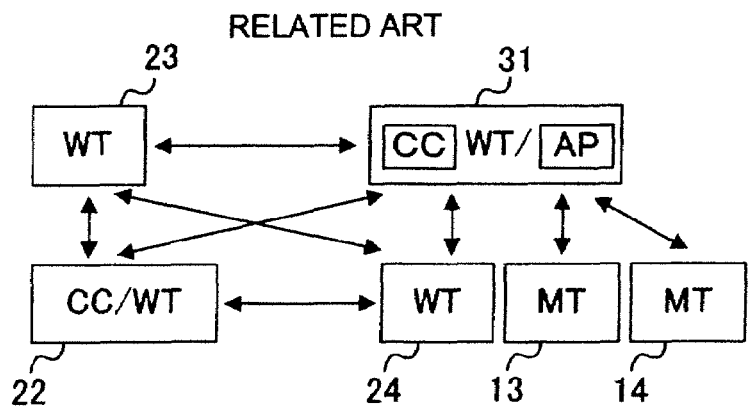
FIG. 3 is a block diagram illustrating a configuration of a network in which the master-slave type network and the direct link type network are integrated each other.
Figure 4:
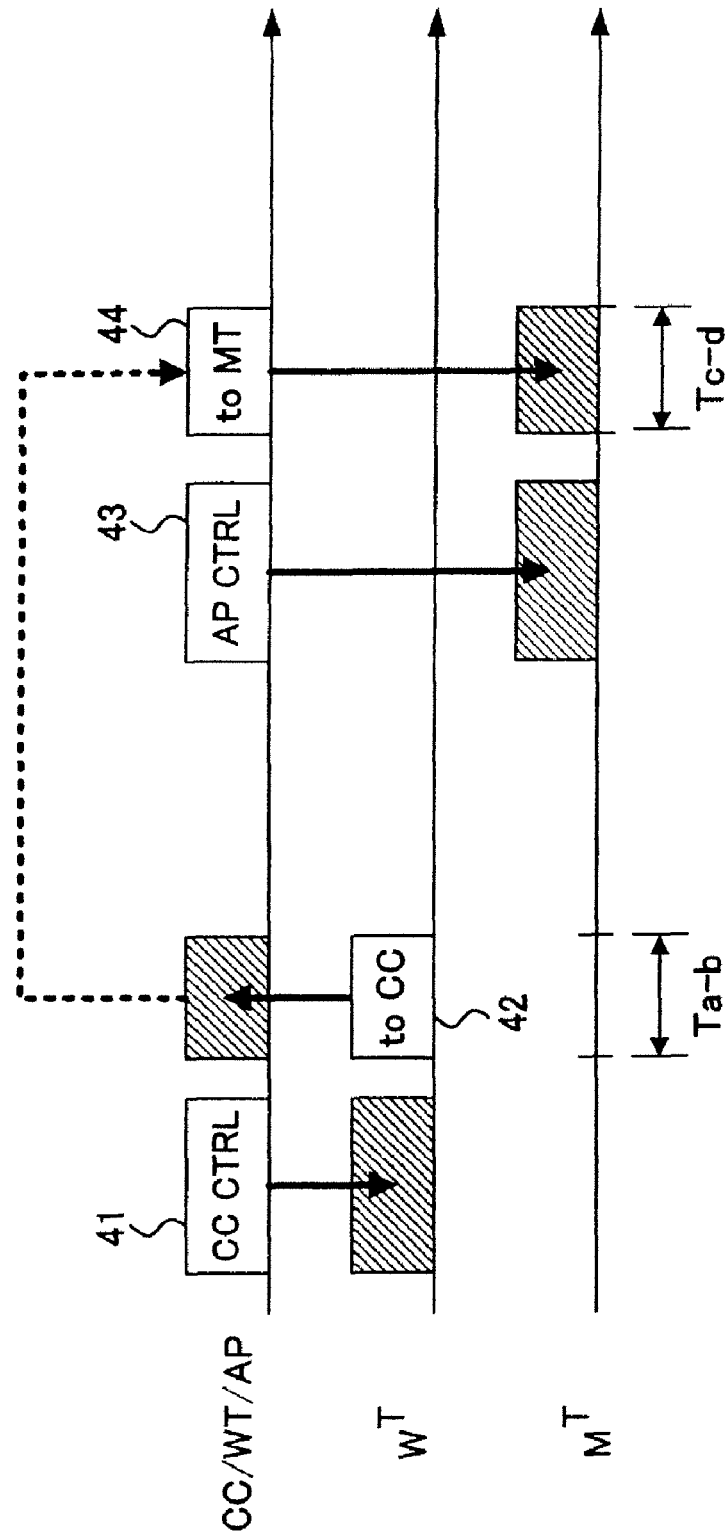
FIG. 4 is a timing sheet illustrating a scheduling operation of a conventional communication terminal holding apparatus.
Figure 5:
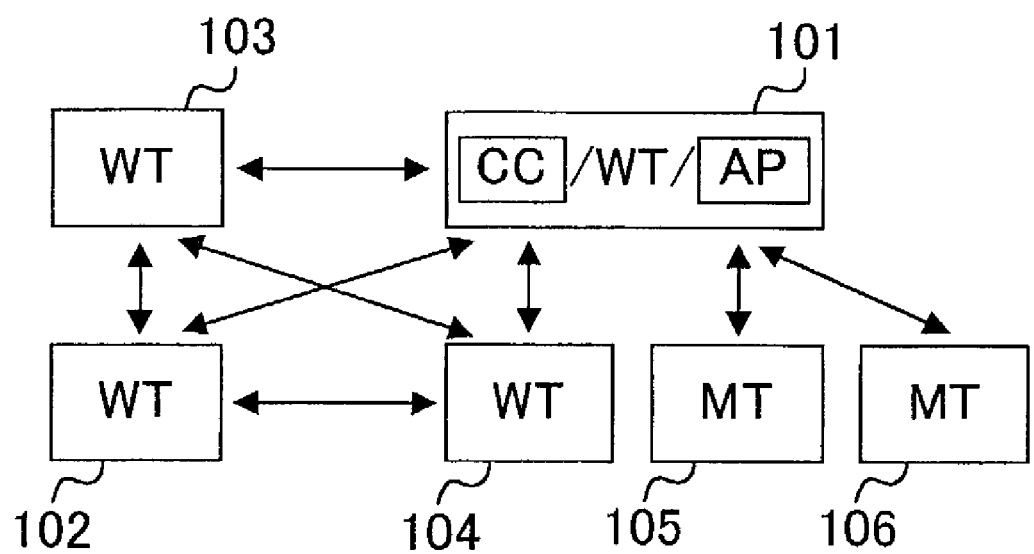
FIG. 5 is a block diagram illustrating a configuration of a network including a communication terminal holding apparatus according to a first embodiment of the present invention.

FIG. 5 is a block diagram illustrating a configuration of a network including a communication terminal holding apparatus according to a first embodiment of the present invention; a master-slave type network and a direct link type network are integrated with each other in the network.

In FIG. 5, a communication terminal holding apparatus 101 according to a first embodiment of the present invention is provided with CC/WT/AP facilities, which is capable of including both of a WT device apparatus of the direct link type network and an MT device apparatus of the master-slave type network. The communication terminal holding apparatus 101 constitutes the direct link type network along with WT device apparatus 102-104, and constitutes the master-slave type network along with MT device apparatus 105 and 106.

Figure 6:
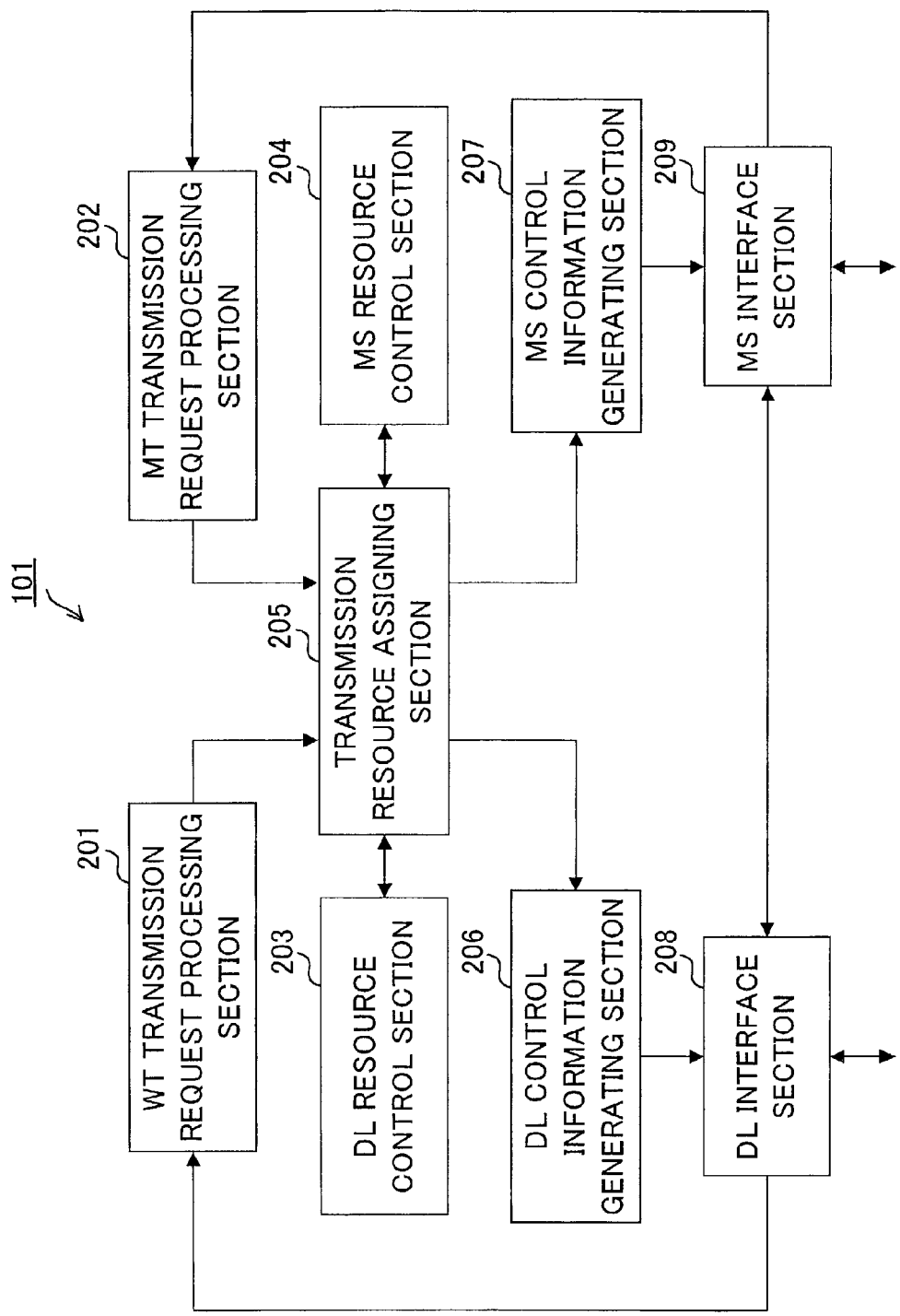
FIG. 6 is a block diagram illustrating a configuration of a communication terminal holding apparatus according to the first embodiment of the present invention.

FIG. 6 is a block diagram illustrating a configuration of the communication terminal holding apparatus 101 according to the first embodiment of the present invention shown in FIG. 5. The communication terminal holding apparatus 101 is constituted comprising a WT transmission request processing section 201, an MT transmission request processing section 202, a DL (direct link type network) resource control section 203, an MS (master-slave type network) resource control section 204, a transmission resource assigning section 205, a DL control information generating section 206, an MS control information generating section 207, a DL interface section 208 and an MS interface section 209.

The WT transmission request processing section 201 processes a transmission request signal, which requests to transmit data from a WT device apparatus to an MT device apparatus, transmitted from the WT device apparatus to output the data to the transmission resource assigning section 205. The MT transmission request processing section 202 processes a transmission request signal, which requests to transmit data from an MT device apparatus to a WT device apparatus, transmitted from the MT device apparatus shown in FIG. 5 to output the data to the transmission resource assigning section 205.

The DL resource control section 203 controls assignment status of communication resources of the direct link type network on a table, and renews the control table according to a notice from the transmission resource assigning section 205. The MS resource control section 204 controls assignment status of communication resources of the master-slave type network on a table and renews the control table according to a notice from the transmission resource assigning section 205. The contents of the tables controlled in the DL resource control section 203 and the MS resource control section 204 will be described later.

When the transmission request signal is input from the WT transmission request processing section 201 or the MT transmission request processing section 202, the transmission resource assigning section 205 refers to the tables controlled by the DL resource control section 203 and the MS resource control section 204, assigns communication resources appropriate to the communication, and notifies the assignment results to the DL control information generating section 206 and the MS control information generating section 207. Detailed description of the scheduling operation of the communication terminal holding apparatus 101 having the transmission resource assigning section 205 as the center thereof will be given later.

The DL control information generating section 206 generates, when the notice from the transmission resource assigning section 205 is received, a piece of control information for scheduling to transmit the control information to the WT device apparatus at the transmitting side or the receiving side of the data communication via the DL interface section 208. The MS control information generating section 207 generates, when the notice from the transmission resource assigning section 205 is received, a piece of control information for scheduling to transmit the control information to the MT device apparatus at the transmitting side or the receiving side of the data communication via the MS interface section 209.

The DL interface section 208 performs data communications with the WT device apparatus 102-104 of the direct link type network. The MS interface section 209 performs data communications with the MT device apparatus 105 and 106 of the master-slave type network.

Next, a description will be made as to the contents of the tables which are controlled in the DL resource control section 203 and the MS resource control section 204 referring to FIG. 7 and FIG. 8. FIG. 7 is a diagram illustrating the content of the table controlled in the DL resource control section 203; FIG. 8 is a diagram illustrating the content of the table controlled in the MS resource control section 204.

The DL resource control section 203 controls, as shown in FIG. 7, the present assignment status of communication resources of the direct link type network on the table. Likewise, the MS resource control section 204 controls, as shown in FIG. 8, the present assignment status of communication resources of the master-slave type network on the table. In FIG. 7 and FIG. 8, Tn-m represents communication resources of a period of time from time n to m, and the transmitting side apparatus and the receiving side apparatus, which are in communication with each other on the basis of each communication resource, are controlled. Columns of the communication resources of the transmitting side apparatus and the receiving side apparatus, which are presently not used for communication, are indicated as "NOT USED". Also, "BC" in FIG. 7 and FIG. 8 represents broadcast.

The transmission resource assigning section 205 refers to the tables, when carrying out communications between the terminal apparatus held in the different networks, controlled in the DL resource control section 203 and the MS resource control section 204 to assign the same communication resources (for example, T0391-0450) which are not used in the respective networks.

Figure 9:
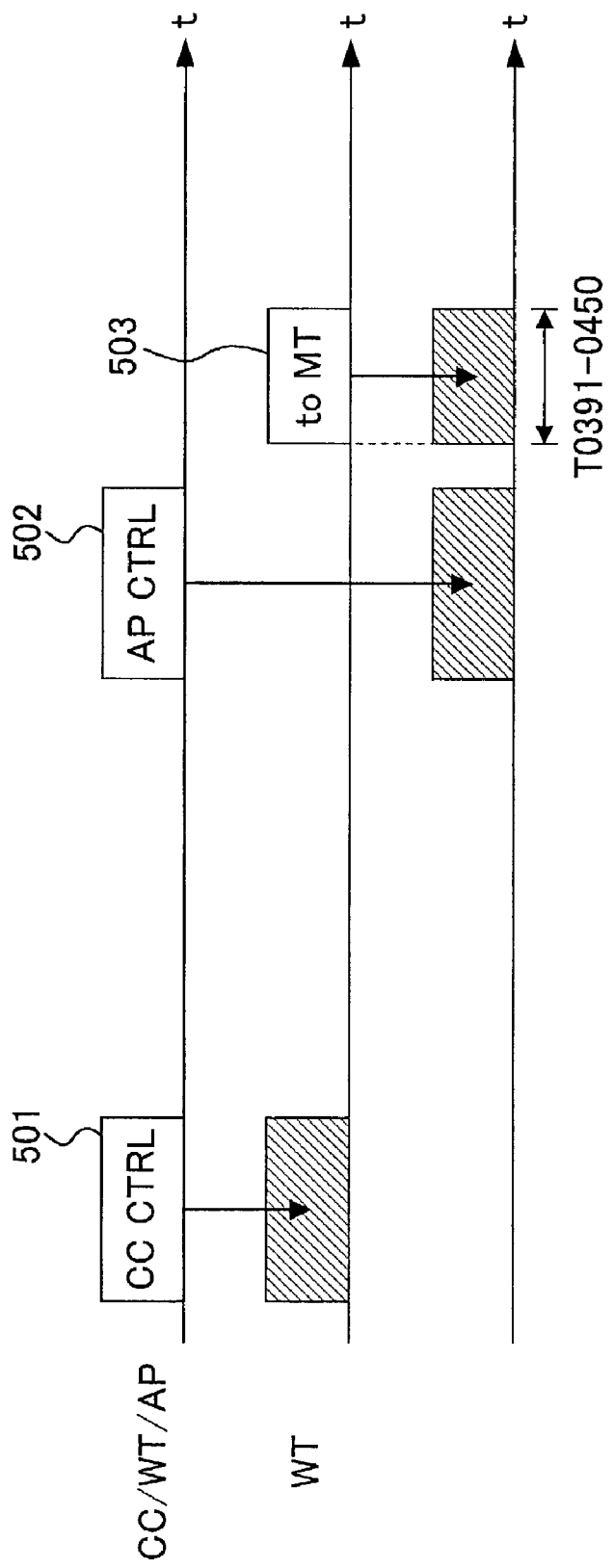
FIG. 9 is a timing sheet illustrating a scheduling operation of the communication terminal holding apparatus according to the first embodiment of the present invention.

Next, a description will be made as to the scheduling operation of the communication terminal holding apparatus 101 while taking an example of the case where a communication request is made from the WT device apparatus 104 to the MT device apparatus 106 referring to FIG. 7, FIG. 8 and the timing sheet in FIG. 9.

First of all, a transmission request signal that requests to transmit data to the MT device apparatus 106 is transmitted from the WT device apparatus 104. The WT transmission request processing section 201 processes the transmission request signal to output to the transmission resource assigning section 205.

The transmission resource assigning section 205 refers to the tables, when the transmission request signal is input, shown in FIG. 7 and FIG. 8 to carry out a scheduling to assign the communication resources T0391-0450, which are presently not used in both networks, as communication resources for transmission and for reception. And, the transmission resource assigning section 205 outputs the assignment result, which represents the communication resources T0391-0450, to the DL resource control section 203, the MS resource control section 204, the DL control information generating section 206 and the MS control information generating section 207. The DL resource control section 203 and the MS resource control section 204 renew the contents of the tables which are controlled basing on the input assignment result.

After that, the DL control information generating section 206 generates control information 501 that instructs a data transmission by means of the communication resources T0391-0450 to transmit to the WT device apparatus 104 via the DL interface section 208. The MS control information generating section 207 generates control information 502 that instructs a data transmission by means of the communication resources T0391-0450 to transmit to the MT device apparatus 106 via the MS interface section 209.

Then, the WT device apparatus 104 transmits the data 503 by means of the communication resources T0391-0450 and the transmitted data 503 is received by the MT device apparatus 106 via the DL interface section 208 and the MS interface section 209 of the communication terminal holding apparatus 101.

Provided that the transmission intervals between the control information 501 and the control information 502 are spaced within a specified range of the network holding, other communications may be established with equal intervals therebetween, or may be followed thereby consecutively. Furthermore, before and after the information communication, although communications such as band request, communication control or the like may be carried out, it is permitted provided that these communications conform to the protocols of the respective networks.

Figure 10:
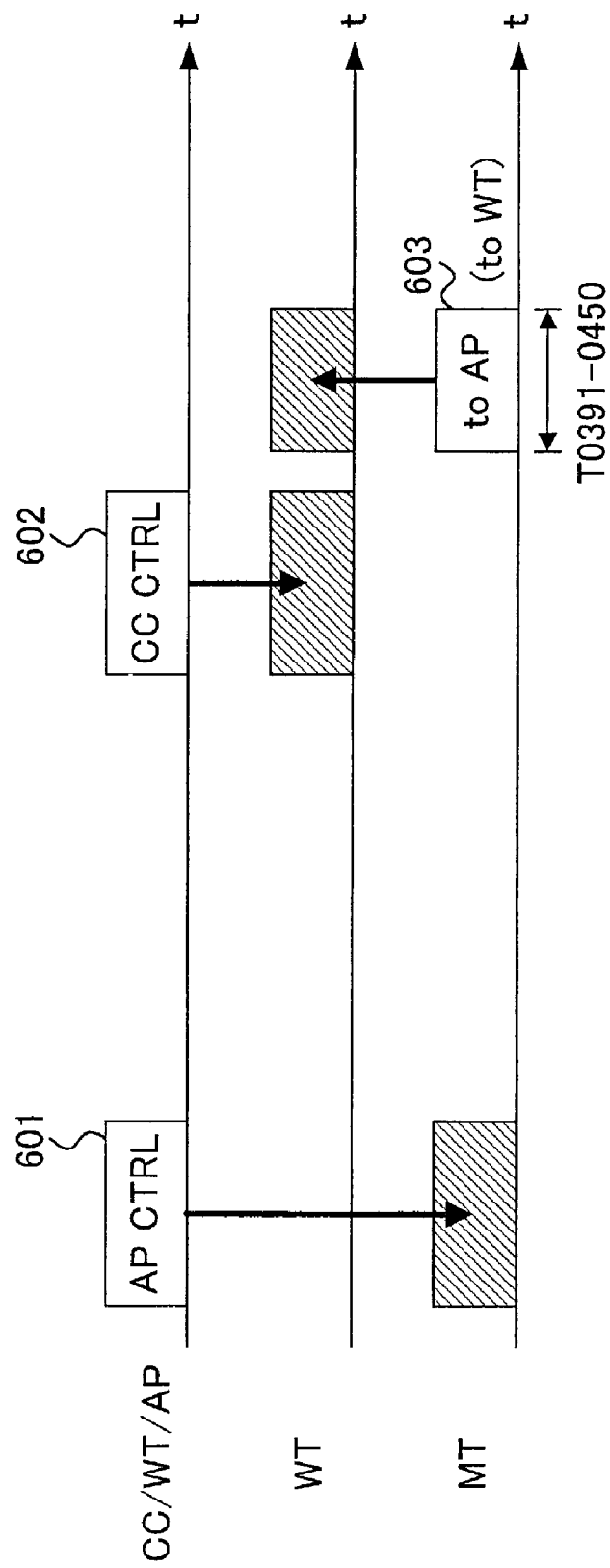
FIG. 10 is a timing sheet illustrating a scheduling operation of the communication terminal holding apparatus according to the first embodiment of the present invention.

Next, referring to the timing flow sheet in FIG. 10, a description will be made as to the scheduling operation of the communication terminal holding apparatus 101 in a case where a communication request is made from the MT device apparatus 106 to the WT device apparatus 104.

First of all, when a transmission request signal is input from the MT device apparatus 106, the communication terminal holding apparatus 101 carries out a scheduling to assign the same communication resources as the communication resources for transmission and reception within the range of communication resources that are presently not used in both networks. And, the communication terminal holding apparatus 101 transmits control information 601 that instructs a data transmission by means of the assigned communication resources (for example, T0391-0450) to the MT device apparatus 106, and transmits control information 602 that instructs a data reception by means of the assigned communication resources to the WT device apparatus 104.

The MT device apparatus 106 transmits the data 603 by means of the assigned communication resources, and the transmitted data 603 is received by the WT device apparatus 104 via the communication terminal holding apparatus 101. Since being a terminal apparatus within the master-slave type network, the MT device apparatus 106 transmits the data to the communication terminal holding apparatus 101. However, the communication terminal holding apparatus 101 transmits the received data promptly without performing any operation with respect thereto; consequently, the communication from the MT device apparatus to the WT device apparatus can be established.

As described above, according to the first embodiment, when carrying out communication between terminal apparatus held in different networks respectively, it is enabled to assign a piece of communication resources to the communication of one data by referring to the assignment status of the communication resources of the respective networks and carrying out a scheduling that assigns the same communication resources to the transmitting side and the receiving side, respectively; thus, it is enabled to utilize the communication resources effectively.

Second Embodiment

Figure 11:
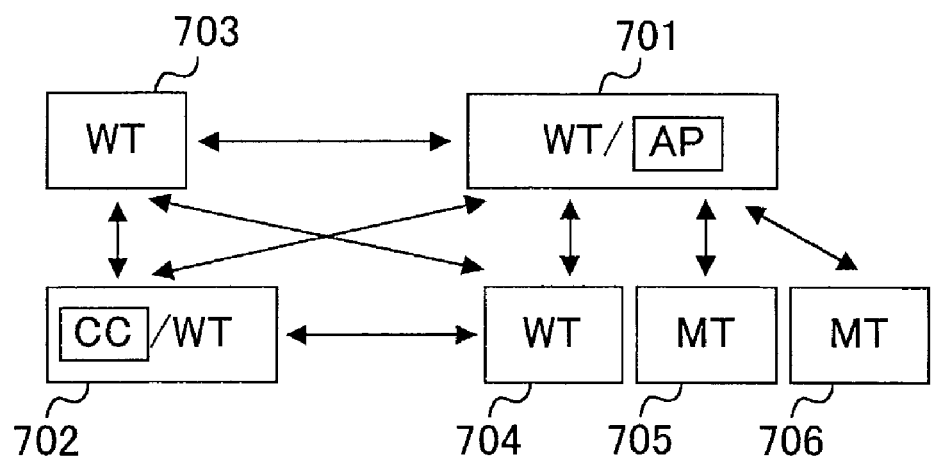
FIG. 11 is a block diagram illustrating a configuration of a network including a communication terminal holding apparatus according to a second embodiment of the present invention.

FIG. 11 is a block diagram illustrating a configuration of a network including a communication terminal holding apparatus according to a second embodiment of the present invention, and a master-slave type network and a direct link type network are integrated with each other in this network.

A point where the second embodiment is different from the first embodiment is that an apparatus of a communication terminal holding apparatus which makes the CC facility operate (CC/WT), is different from an apparatus of a communication terminal holding apparatus which makes the AP facility operate (CC/WT), and that the communication terminal holding apparatus of the WT/AP according to the second embodiment cooperates with the scheduling carried out by a communication terminal holding apparatus of the CC/WT which has the same configuration as that of the conventional apparatus.

Referring to FIG. 11, a communication terminal holding apparatus 701 according to the second embodiment of the present invention has WT/AP facilities, which are capable of holding an MT device apparatus of the master-slave type network. Also, the communication terminal holding apparatus 702 has CC/WT facilities, which are capable of holding a WT device apparatus of the direct link type network. The communication terminal holding apparatus 701 constitutes the direct link type network along with the communication terminal holding apparatus 702 and WT device apparatus 703 and 704 and constitutes the master-slave type network along with MT device apparatus 705 and 706.

Figure 12:
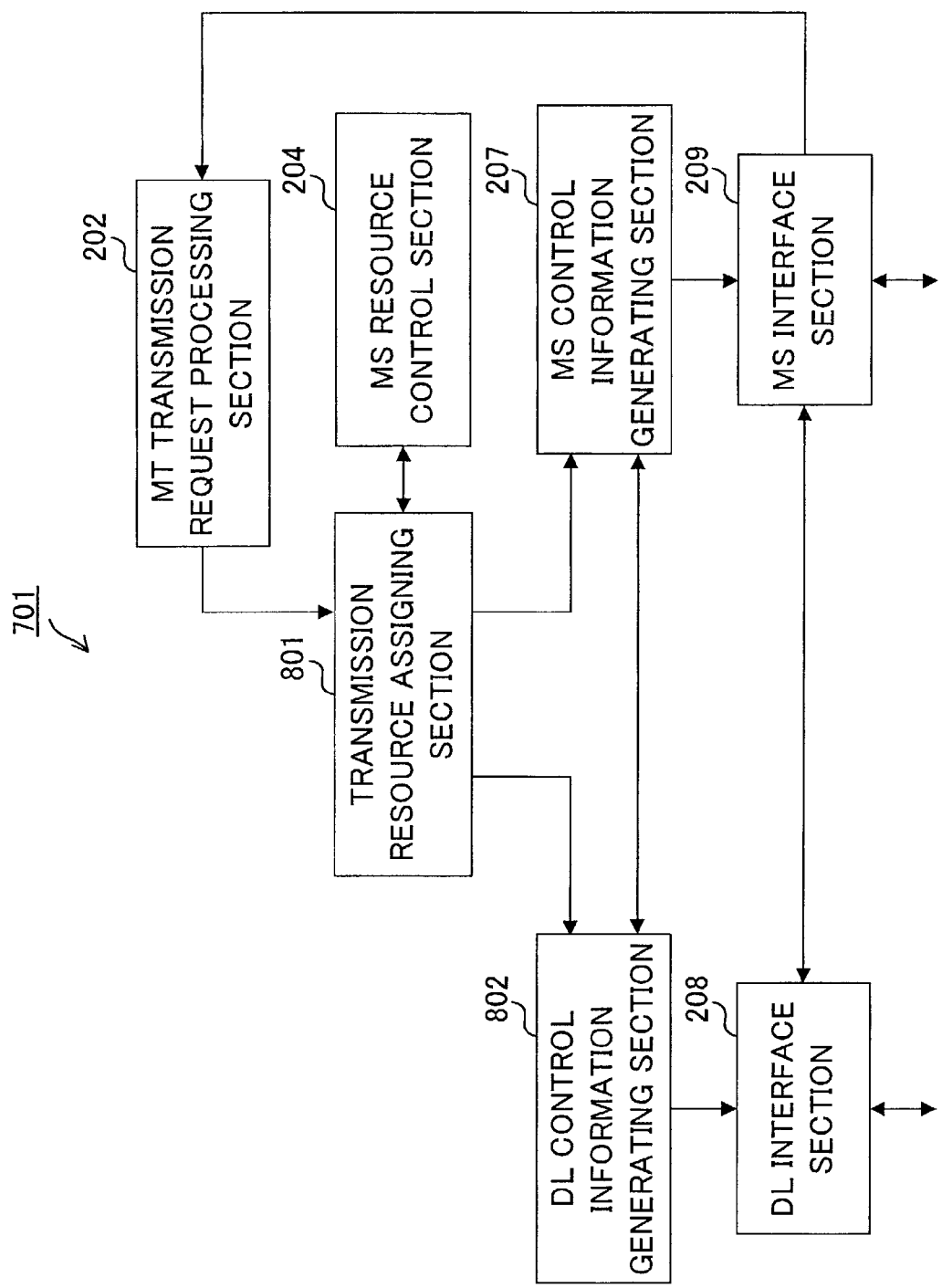
FIG. 12 is a block diagram illustrating a configuration of a communication terminal holding apparatus according to the second embodiment of the present invention.

FIG. 12 is a block diagram illustrating a configuration of a communication terminal holding apparatus 701 according to the first (second) embodiment of the present invention shown in FIG. 11. In the communication terminal holding apparatus 701 shown in FIG. 12, the components that are the same as those of the communication terminal holding apparatus 101 shown in FIG. 6 are given with the same reference numerals in FIG. 6 and the descriptions thereof will be omitted.

The communication terminal holding apparatus 701 shown in FIG. 12 is different, compared with the communication terminal holding apparatus 101 shown in FIG. 6, in the operation of the transmission resource-assigning section 801 from that of the transmission resource assigning section 205. Also, the communication terminal holding apparatus 701 shown in FIG. 12 adopts the constitution such that, compared with the communication terminal holding apparatus 101 shown in FIG. 6, the WT transmission request processing section 201, the DL resource control section 203 and the DL control information generating section 206 are eliminated; and a DL control information processing section 802 is added thereto. Further, in FIG. 11 and FIG. 12, the communication terminal holding apparatus 702 controls the assignment status of communication resources of the direct link type network on the table, and performs the scheduling.

Now, a description will be made as to the operation of the communication terminal holding apparatus 701 of the case where a communication request is made from the WT device apparatus 704 to the MT device apparatus 706.

In this case, first of all, a transmission request signal that requests to transmit data to the MT device apparatus 706 is transmitted from the WT device apparatus 704. Then, the communication terminal holding apparatus 702, which has received the transmission request signal, transmits a piece of control information that requests information of assignable communication resources of the master-slave type network to the communication terminal holding apparatus 701. The control information is received by the DL interface section 208 and is input to the transmission resource assigning section 801 via the DL control information processing section 802.

The transmission resource assigning section 801 refers to the table controlled by the MS resource control section 204, and outputs communication resources, which are appropriate to the communication, to the DL control information processing section 802. The DL control information processing section 802 generates a piece of information which indicates communication resources appropriate to the communication of the master-slave type network to output to the communication terminal holding apparatus 702 via the DL interface section 208.

The communication terminal holding apparatus 702 refers to the information received from the DL control information processing section 802 and the present status of communication resources of the direct link type network, and carries out a scheduling to assign the communication resources for transmission. For example, as shown in foregoing FIG. 8, assuming that the communication resources of the master-slave type network, which are presently not used, are T0391-2000, and as shown in foregoing FIG. 7, the communication resources of the direct link type network, which are presently not used, are T0001-1000 and T1351-2000, the communication terminal holding apparatus 702 assigns the communication resources within a range of T0391-1000 and T1351-2000, which are not used by both two networks.

Figure 13:
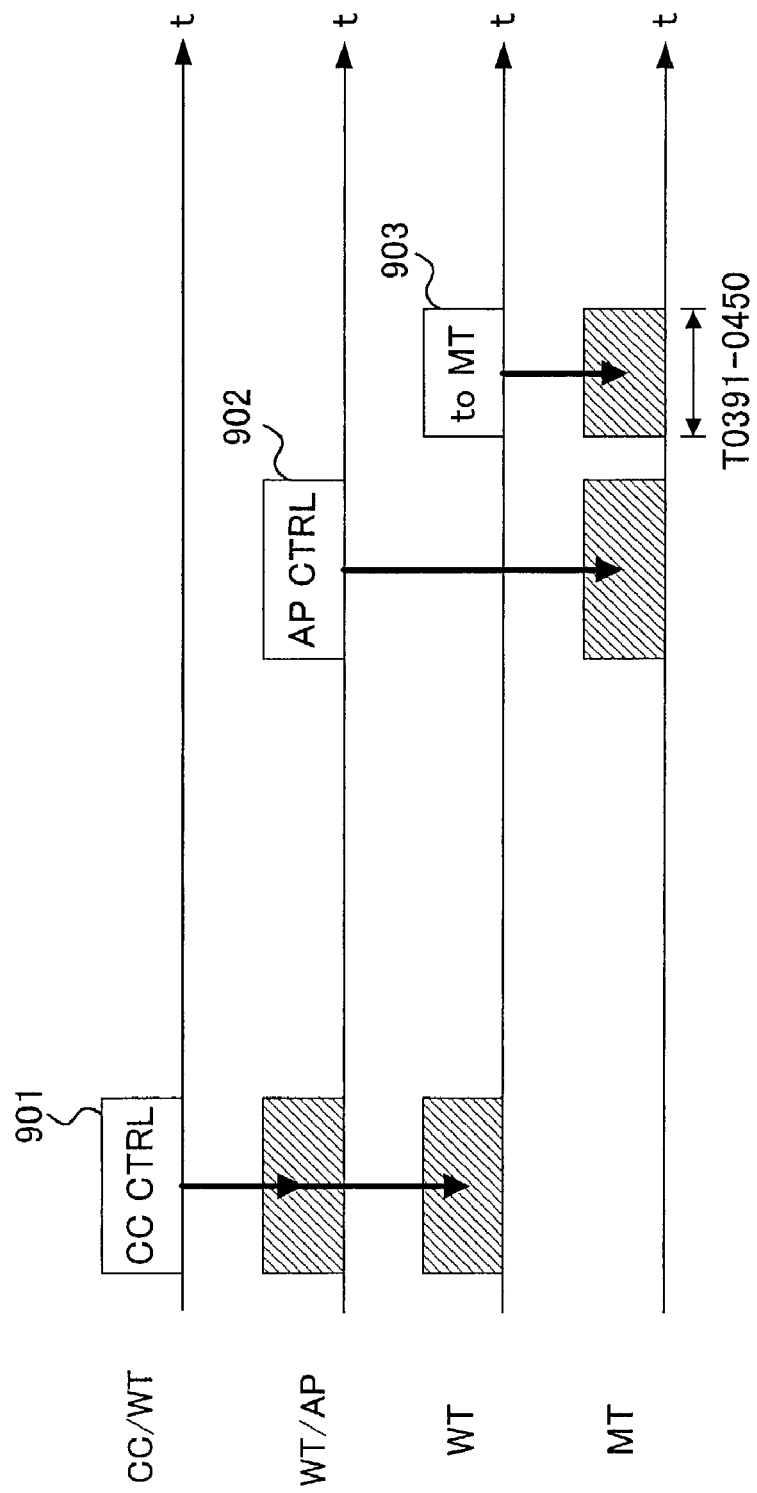
FIG. 13 is a timing sheet illustrating a scheduling operation of the communication terminal holding apparatus according to the second embodiment of the present invention.

The communication terminal holding apparatus 701 cooperates with the scheduling performed by the communication terminal holding apparatus 702. FIG. 13 is a timing sheet illustrating a scheduling operation performed by the communication terminal holding apparatus 701 and 702 in a case where a communication request is made from the WT device apparatus 704 to the MT device apparatus 706.

The communication terminal holding apparatus 702 generates a piece of control information 901 that instructs data transmission by means of the assigned communication resources (for example, T0391-0450) to transmit to the WT device apparatus 704 and the communication terminal holding apparatus 701. In the communication terminal holding apparatus 701, the control information 901 is received by the DL interface section 208 and input to the MS control information generating section 207 via the DL control information processing section 802.

The MS control information generating section 207 generates a piece of control information 902 that instructs a data reception by means of the same communication resources as the communication resources for transmission to transmit to the MT device apparatus 706 via the MS interface section 209.

The WT device apparatus 704 transmits data 903 by means of the communication resources instructed by the control information, and the transmitted data 903 is received by the MT device apparatus 706 via the DL interface section 208 and the MS interface section 209 of the communication terminal holding apparatus 701.

Provided that the transmission intervals between the control information 901 and the control information 902 are spaced within a specified range of the network holding, other communications may be established with equal intervals therebetween, or may be followed thereby consecutively. Furthermore, before and after the information communication, although communications such as band request, communication control or the like may be carried out, it is permitted provided that these communications conform to the protocols of the respective networks.

Next, a description will be made as to the operation of the communication terminal holding apparatus 701 of the case where a communication request is made from the MT device apparatus 706 to the WT device apparatus 704.

In this case, the MT transmission request processing section 202 processes the transmission request signal transmitted from the MT device apparatus 706 to output to the transmission resource assigning section 801.

The transmission resource assigning section 801 refers to the table controlled by the MS resource control section 204 and outputs the communication resources appropriate to the communication to the DL control information processing section 802. The DL control information processing section 802 generates a piece of information that indicates the communication resources appropriate to the communication of the master-slave type network to output to the communication terminal holding apparatus 702 via the DL interface section 208.

The communication terminal holding apparatus 702 refers to the information received from the DL control information processing section 802 and the present status of communication resources of the direct link type network, and carries out a scheduling to assign communication resources for reception.

Figure 14:
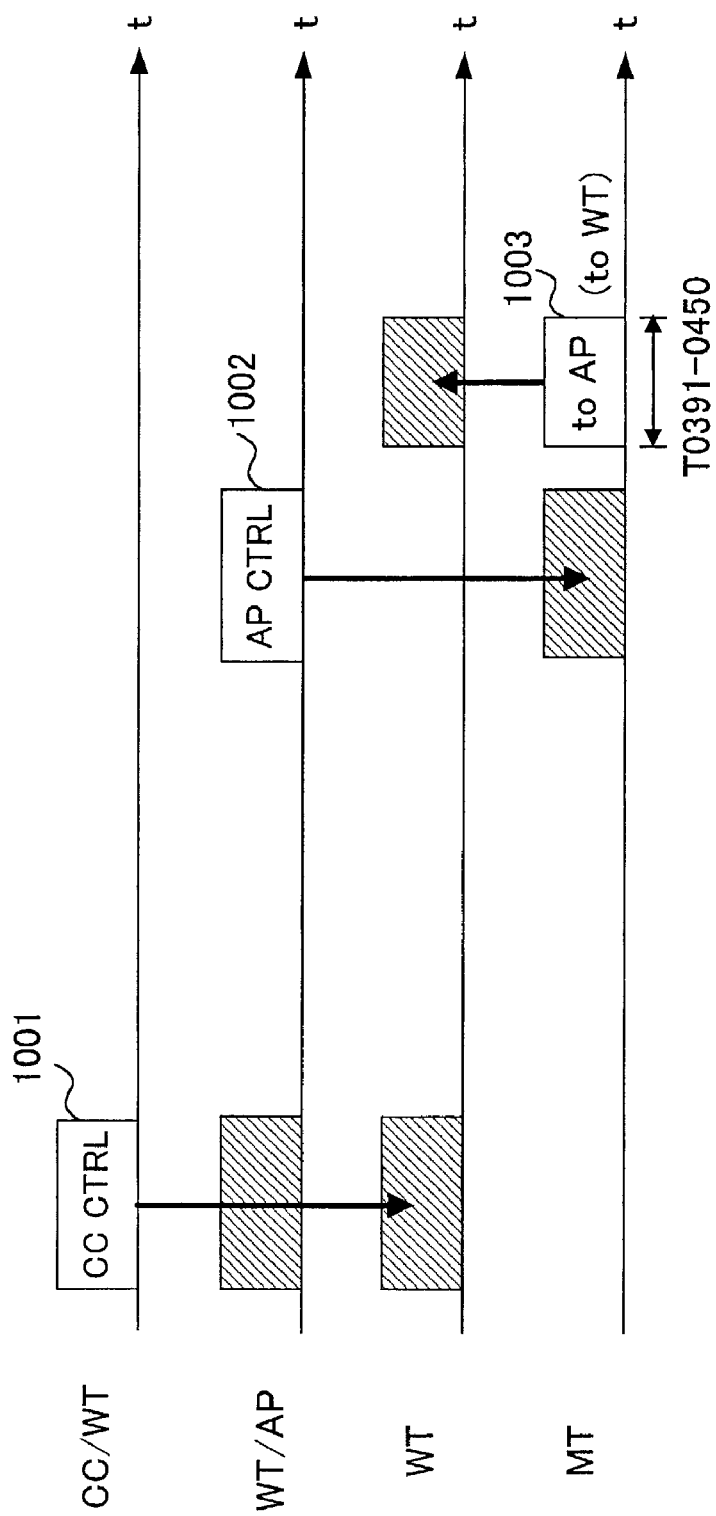
FIG. 14 is a timing sheet illustrating a scheduling operation of the communication terminal holding apparatus according to the second embodiment of the present invention.

The communication terminal holding apparatus 701 cooperates with the scheduling performed by the communication terminal holding apparatus 702. FIG. 14 is a timing sheet illustrating the scheduling operation performed by the communication terminal holding apparatus 701 and 702 of the case where a communication request is made from the MT device apparatus 706 to the WT device apparatus 704.

The communication terminal holding apparatus 702 generates a piece of control information 1001 that instructs a data reception by means of the assigned communication resources (for example, T0391-0450) to transmit to the WT device apparatus 704 and to the communication terminal holding apparatus 701. In the communication terminal holding apparatus 701, the control information 1001 is received by the DL interface section 208 to input to the MS control information generating section 207 via the DL control information processing section 802.

The MS control information generating section 207 generates a piece of control information 1002 that instructs a data transmission by means of the same communication resources as the communication resources for reception to transmit to the MT device apparatus 706 via the MS interface section 209.

The MT device apparatus 706 transmits data 1003 by means of the communication resources instructed by the control information, and the transmitted data 1003 is received by the WT device apparatus 704 via the MS interface section 209 and the DL interface section 208 of the communication terminal holding apparatus 701. Since being a terminal apparatus within the master-slave type network, the MT device apparatus 706 transmits the data to the communication terminal holding apparatus 701. However, the communication terminal holding apparatus 701 transmits the received data promptly without performing any operation with respect to the data; consequently, it is enabled to establish the communication from the MT device apparatus to the WT device apparatus.

Provided that the transmission intervals between the control information 901 and the control information 902 are spaced within a specified range of the network holding, other communications may be established with equal intervals therebetween, or may be followed thereby consecutively. Furthermore, before and after the information communication, although communications such as band request, communication control or the like may be carried out, it is permitted provided that communications conform to the protocols of the respective networks.

As described above, according to the second embodiment, when carrying out communications between the terminal apparatus held in different networks, it is enabled to assign a piece of communication resources to a communication of one data by carrying out the scheduling while a communication terminal holding apparatus having the AP facility cooperates with a communication terminal holding apparatus having the CC facility; thus, it is enabled to utilize the communication resources effectively.

Third Embodiment

A plurality of types are provided for radio network, and some of them are capable of integrating with each other as the foregoing first and second embodiments. For example, although HiSWAN and HiperLAN have different network structures respectively, since the channel layout thereof almost coincides each other, it is possible to carry out communications between the terminal apparatus held in different networks by means of the same communication resources. Generally, the network structure of the HiSWAN is the master-slave type and the network structure of the HiperLAN is the master-slave type or the direct link type.

Figure 15:
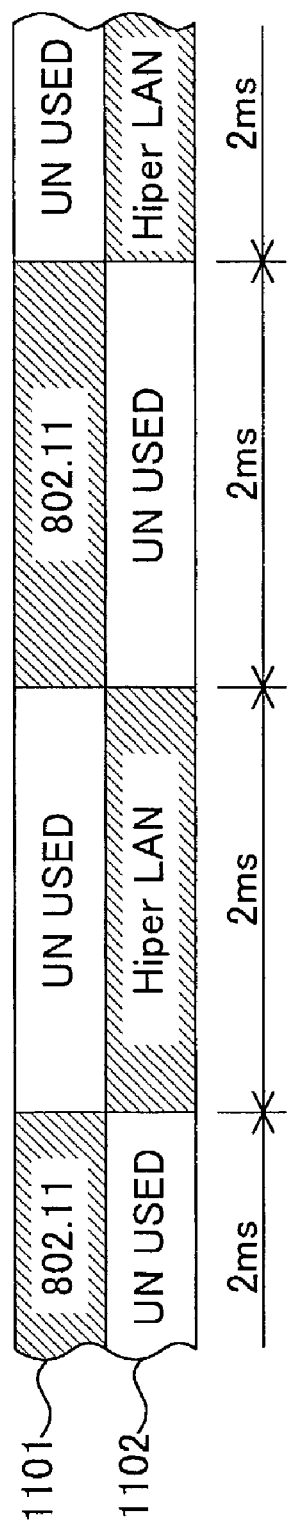
FIG. 15 is a diagram illustrating an example of a configuration of a multi frame.

On the other hand, some of the protocols for the radio network are not capable of integrating so easily even when the present invention is applied to. For example, since IEEE802.11 and HiperLAN have a quite different channel layout respectively, it is impossible to carry out communications between the terminal apparatus held in networks having different protocol respectively by means of the same communication resources. In such a case, a plurality of communication frames as shown in FIG. 15 are prepared (in FIG. 15, the case where two communication frames of 1101 and 1102 are prepared is shown), it is adapted so as to make the information of the protocols, which are not capable of integrating with each other by means of the respective communication frames, be transmitted, and to carry out the scheduling so as not to transmit information by means of any other communication frames during the period of time when a piece of information is transmitted by means of a communication frame. In FIG. 15, the case, in which a scheduling is carried out so as to make the communication frame 1101 transmit a piece of information of the IEEE802.11 and to make the communication frame 1102 transmit information of the HiperLAN or the HiSWAN; and the transmitting communication frame is changed over every 2 ms, as shown.

A plurality of communication frames prepared for transmitting information between these protocols, which are not capable of integrating with each other, is called as "multi frame". In a third embodiment, a description will be made as to a communication terminal holding apparatus and a scheduling method thereof in a network of the multi frame.

Figure 16:
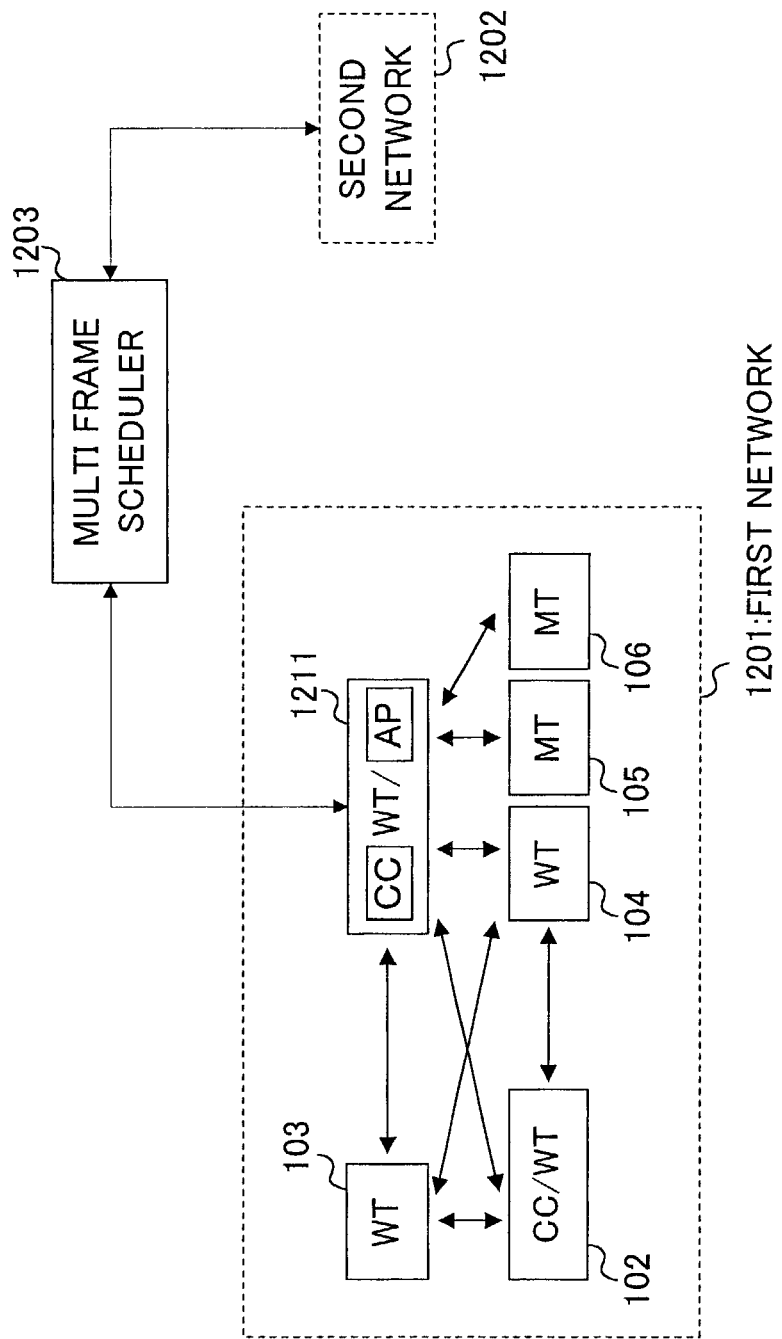
FIG. 16 is a block diagram illustrating a configuration of a network including a communication terminal holding apparatus according to a third embodiment of the present invention.

FIG. 16 is a block diagram illustrating a configuration of a network including a communication terminal holding apparatus according to the third embodiment of the present invention. In FIG. 16, a first network 1201 is a network in which the master-slave type network and the direct link type network are integrated with each other as shown by the foregoing embodiment 1. A second network 1202 is a network of a protocol which is not capable of integrating with the first network 1201. For example, the first network 1201 is a network in which a HiperLAN and a HiSWAN are integrated with each other; the second network 1202 is a network of an IEEE802.11. A multi frame scheduler 1203 performs assignment of communication resources between the first network 1201 and the second network 1202.

Figure 17:
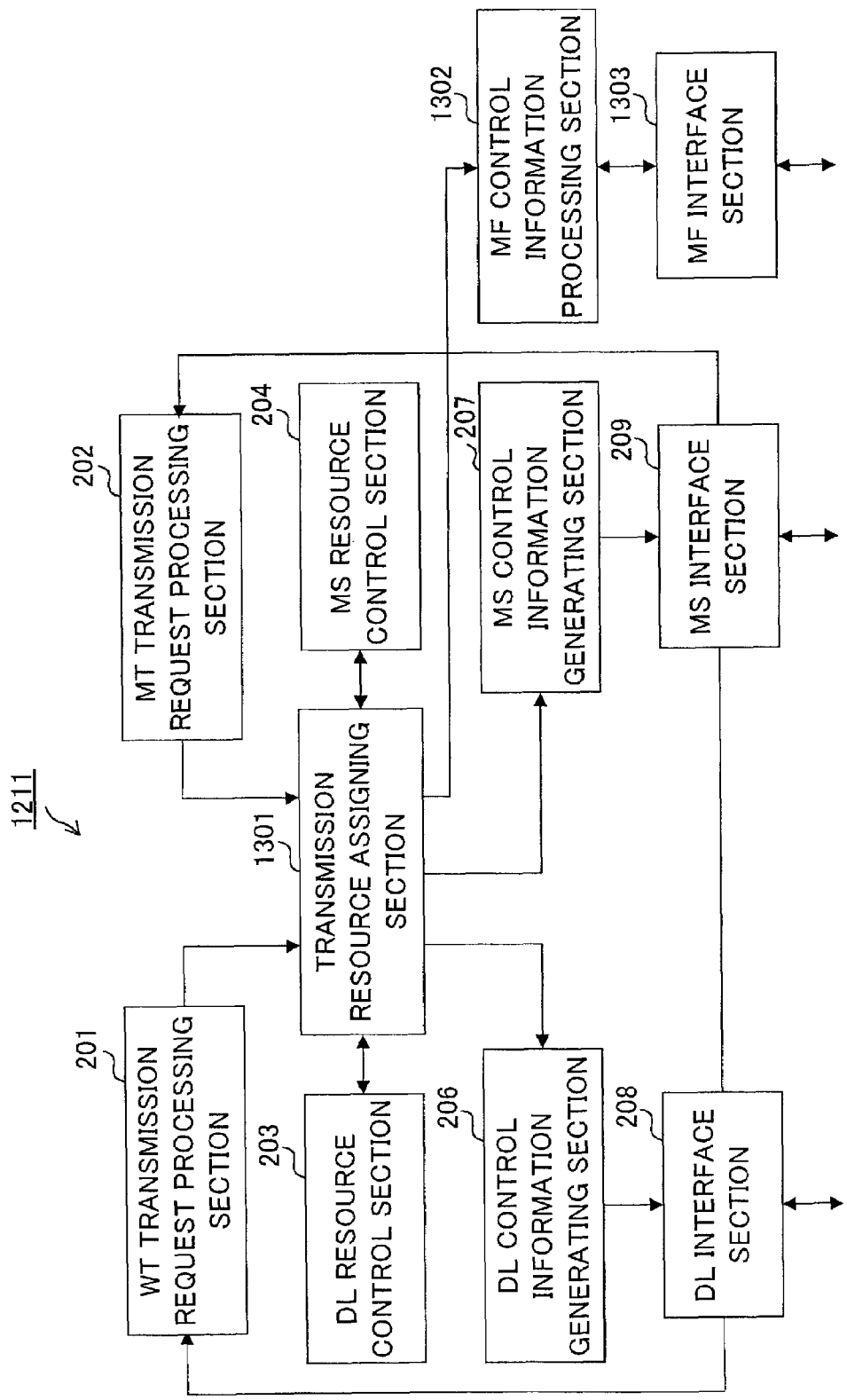
FIG. 17 is a block diagram illustrating a configuration of a communication terminal holding apparatus according to the third embodiment of the present invention.

The first network 1201 is different, compared with the network shown in FIG. 5, only in the internal configuration of the communication terminal holding apparatus 1211 according to the third embodiment from that of the communication terminal holding apparatus 101. FIG. 17 is a block diagram illustrating a configuration of the communication terminal holding apparatus 1211. In the communication terminal holding apparatus 1211 shown in FIG. 17, components, which are the same as those of the communication terminal holding apparatus 101 shown in FIG. 6, will be given with the same reference numerals as those in FIG. 6, and the description thereof will be omitted.

The communication terminal holding apparatus 1211 shown in FIG. 17 is different, compared with the communication terminal holding apparatus 101 shown in FIG. 6, in the operation of the communication resource assigning section 1301 from that of the transmission resource assigning section 205. Also, the communication terminal holding apparatus 1211 shown in FIG. 17 adopts the constitution in which an MF (multi frame) control information processing section 1302 and an MF interface section 1303 are added to the communication terminal holding apparatus 101 shown in FIG. 6.

The MF control information processing section 1302 receives a piece of information that indicates communication resources, which are assigned to the first network 1201 by the multi frame scheduler 1203, via the MF interface section 1303 to output to the communication resource assigning section 1301.

The communication resource assigning section 1301 refers to the information input from the MF control information processing section 1302, and carries out a scheduling within a range of the communication resources assigned to the first network 1201.

For example, when a communication request between the terminal apparatus held in different networks of the first network 1201 is made, the communication resource assigning section 1301, in the same manner as the first embodiment, refers to the tables controlled by the DL resource control section 203 and the MS resource control section 204, and carries out the scheduling to assign the communication resources appropriate to the communication within the communication resources assigned to the first network 1201.

Also, when a communication request is made to a terminal apparatus held in the second network 1202 from a terminal apparatus held in the first network 1201, a scheduling to assign the communication resources, which is presently not used, as the communication resources for transmission within the communication resources assigned to the first network 1201, is performed to notice to the MF control information processing section 1302. The MF control information processing section 1302 generates, receiving the notice from the communication resource assigning section 1302(1301), a piece of control information for scheduling to transmit to the multi frame scheduler 1203 via the MF interface section 1303.

As described above, by performing scheduling within the communication resources assigned by the multi frame scheduler, it is enabled to apply the present invention to a multi frame network structure.

Even between the protocols such as the HiperLAN and the IEEE802.11 that are not capable of integrating each other at the point of time the present invention was made, in the future, such a case is conceivable that an extension may be made in an upper layer for an extension of message or an interconnection to reduce problems due to the layout of the channels and it may be enabled to carry out communications via the same communication resources in a partial or the entire communication period. In such a case, it is enabled to apply the method described in the present invention to the communication between these protocols.

As demonstrated in the foregoing descriptions, according to the present invention, by referring to the assignment status of the communication resources of each network, it is enabled to carry out the scheduling to assign the same communication resources to the transmitting side and the receiving side; thus it is enabled to utilize the communication resources effectively.

This application is based on the Japanese Patent Application No. 2000-261951 filed on Aug. 30, 2000, entire content of which is expressly incorporated by reference herein.

INDUSTRIAL APPLICABILITY

The present invention is suitably applicable to a wire communication system and a mobile communication system comprising a plurality of networks having structures different from each other.

The invention claimed is:

1. A communication terminal holding apparatus used in a first network that transmits and receives information with a second network adopting a different channel structure by using a plurality of types of communication frames between which a time period to transmit the information varies, the communication terminal holding apparatus comprising:

an information processing section that acquires communication resource information indicating a communication resource in a first communication frame assigned to the first network; and a communication resource assigning section that, when a communication request is issued from a terminal apparatus held in the first network, with reference to the communication resource information, assigns an unused communication resource in the first communication frame to the terminal apparatus having sent the communication request, wherein:

when a communication request is issued between terminal apparatuses held in different networks in the first network, the resource assigning section assigns, to both the terminal apparatus on the transmitting side and the terminal apparatus on the receiving side, the same communication resource that is unused in the network holding the terminal apparatus on the transmitting side and the network holding the terminal apparatus on the receiving side, and, when a communication request is issued from a terminal apparatus held in the first network to a terminal apparatus held in the second network, assigns an unused communication resource to the terminal held in the first network, and the first network includes a master-slave type network or a network integrating a master-slave type network and a direct link type network, and the second network cannot integrate with the first network.

2. The communication terminal holding apparatus according to claim 1, wherein, based on the communication resource information, the communication resource assigning section assigns a communication resource, which provides a time period to allow a terminal held in the second network to perform communication and which is unused in the first communication frame, to the terminal apparatus having sent the communication request, among communication resources in a second communication frame assigned to the second network.

3. The communication terminal holding apparatus according to claim 1, wherein the second network includes an IEEE 802.11-based network.

4. A scheduling method of a communication terminal holding apparatus used in a first network that transmits and receives information with a second network adopting a different channel structure, by using a plurality of types of communication frames between which a time period to transmit the information varies, the method comprising the steps of:

acquiring communication resource information indicating a communication resource in a first communication frame assigned to the first network;

when a communication request is issued from a terminal apparatus held in the first network, with reference to the communication resource information, assigning an unused communication resource in the first communication frame to the terminal apparatus having sent the communication request;

when a communication request is issued between terminal apparatuses held in different networks in the first network, assigning, to both the terminal apparatus on the transmitting side and the terminal apparatus on the receiving side, the same communication resource that is unused in the network holding the terminal apparatus on the transmitting side and the network holding the terminal apparatus on the receiving side; and when a communication request is issued from a terminal apparatus held in the first network to a terminal apparatus held in the second network assigning an unused communication resource to the terminal held in the first network, wherein the first network includes a master-slave type network or a network integrating a master-slave type network and a direct link type network and the second network cannot integrate with the first network.

5. The scheduling method according to claim 4, further comprising, based on the communication resource information, assigning a communication resource, which provides a time period to allow a terminal held in the second network to perform communication and which is unused in the first communication frame, to the terminal apparatus having sent the communication request, among communication resources in a second communication frame assigned to the second network.

6. The scheduling method according to claim 4, wherein the second network includes an IEEE 802.11-based network.

\* \* \* \* \*

UNITED STATES PATENT AND TRADEMARK OFFICE
CERTIFICATE OF CORRECTION

| | | |
|---|---|---|
| PATENT NO. | : 7,660,895 B2 | Page 1 of 1 |
| APPLICATION NO. | : 10/111673 | |
| DATED | : February 9, 2010 | |
| INVENTOR(S) | : Jun Hirano et al. | |

It is certified that error appears in the above-identified patent and that said Letters Patent is hereby corrected as shown below:

Title Page, Item (54) and at Column 1, lines 1-3,

The title of the Letters Patent which issued on February 9, 2010, incorrectly reads:

"COMMUNICATION TERMINAL ACCOMMODATION APPARATUS AND SCHEDULING METHOD"

and should read:

"COMMUNICATION TERMINAL HOLDING APPARATUS AND SCHEDULING METHOD"

Claim 4, column 14, line 11 of the Letters Patent which issued on February 9, 2010, incorrectly reads:

"tus held in the second network assigning an unused"

and should read:

"tus held in the second network, assigning an unused"

Claim 4, column 14, line 16 of the Letters Patent which issued on February 9, 2010, incorrectly reads:

"work and a direct link type network and the second"

and should read:

"work and a direct link type network, and the second"

Signed and Sealed this

Fifth Day of October, 2010

David J. Kappos
*Director of the United States Patent and Trademark Office*